(12) United States Patent
Heyward et al.

(10) Patent No.: US 6,439,837 B1
(45) Date of Patent: Aug. 27, 2002

(54) NOZZLE BRAZE BACKSIDE COOLING

(75) Inventors: John Peter Heyward, Loveland; Robert Ingram Ackerman, West Chester; Richard Hartley Pugh, Maineville; Steven Curtiss Warfield, Mason; Kenneth Morand Lieland, Cincinnati, all of OH (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 09/604,127

(22) Filed: Jun. 27, 2000

(51) Int. Cl.[7] .............................................. F04D 29/38
(52) U.S. Cl. ...................................... 415/115; 416/97 R
(58) Field of Search ........................ 415/115; 416/97 R, 416/97 A, 213 R, 214 A (56) References Cited

U.S. PATENT DOCUMENTS

| 3,475,107 A | * | 10/1969 | Auxier | ...................... 416/96 A |
|---|---|---|---|---|
| 5,383,766 A | * | 1/1995 | Przirembel et al. | ........ 416/97 A |
| 5,954,475 A | * | 9/1999 | Matsuura et al. | .......... 416/96 A |
| 5,997,245 A | * | 12/1999 | Tomita et al. | ............. 416/97 A |
| 6,159,545 A | * | 12/2000 | Maline | .................... 416/213 R |

* cited by examiner

Primary Examiner—John Kwon
(74) Attorney, Agent, or Firm—Rodney M. Young; Francis L. Conte (57) ABSTRACT

A nozzle vane includes a row of trailing edge apertures and cooperating inboard slots joined in flow communication with a mid-chord cavity. An outboard slot is spaced outwardly from a respective last one of the inboard slots, and outboard of a respective last one of the trailing edge apertures. The outboard slot extends behind a braze joint between the vane and a supporting band and is effective for backside cooling thereof.

20 Claims, 4 Drawing Sheets

NOZZLE BRAZE BACKSIDE COOLING

BACKGROUND OF THE INVENTION

The present invention relates generally to gas turbine engines, and, more specifically, to turbine nozzles therein.

In a gas turbine engine, air is pressurized in a compressor and mixed with fuel in a combustor for generating hot combustion gases which flow downstream through turbine stages that extract energy therefrom. The high pressure turbine disposed directly downstream of the combustor includes an annular stator nozzle which directs the combustion gases towards a corresponding row of rotor blades extending outwardly from a rotor disk.

The turbine nozzle is formed in arcuate segments for reducing thermal stress therein as the nozzle expands and contracts during operation. Each nozzle segment typically includes a pair of stator vanes fixedly joined to outer and inner arcuate band segments. Since the nozzle vanes are directly exposed to the hot combustion gases, they and their bands are commonly formed of superalloys which maintain strength at elevated temperature.

The vanes and bands are typically cast as individual pieces, assembled together, and brazed at the two roots of each vane where it is mounted in corresponding vane seats in the bands. Brazing provides a strong bond without degrading the high-strength performance of the superalloy nozzle material.

During engine operation, the nozzle is protected from the hot combustion gases by channeling a portion of compressor air inside the hollow vanes for internal cooling thereof, with the air being discharged through rows of film cooling holes extending through one or both sidewalls of the vanes. Since the vanes have airfoil configurations which taper to thin trailing edges, a row of trailing edge apertures is provided for discharging some of the cooling air through the trailing edge and cooling the thin trailing edge region of the vanes.

In one exemplary design, each vane includes a radially extending forward cavity behind the leading edge thereof, and a second radially extending aft cavity disposed at the mid-chord region of the vane between the forward cavity and the trailing edge region of the vane. The two cavities are separated by an internal imperforate bridge for isolating the two cooling circuits from each other.

The forward cavity includes an inlet through the inner band and is closed at the outer band for independently channeling cooling air therein for discharge from the film cooling holes around the leading edge region of the vane.

The aft cavity has an inlet through the outer band and is closed at the inner band for independently receiving cooling air therein which is discharged through film cooling holes of the vane sidewalls as well as through the trailing edge apertures.

Except for the corresponding cavity inlets in the opposite root ends of the vanes, the vane roots are solid or imperforate for providing a strong interconnection between the vanes and bands when brazed together. The thin trailing edge region of each vane is cooled by a row of axially extending inboard slots which join the aft cavity to corresponding ones of the trailing edge apertures.

The trailing edge apertures must be spaced inboard from the corresponding bands so that during the brazing operation the last trailing edge aperture at each end of the vane does not become plugged with braze material under capillary action. Each trailing edge aperture must therefore be sized with a sufficient flow area for channeling therethrough a corresponding portion of the cooling air for cooling the trailing edge region of the vane down to and including the braze joint interface with the bands.

A turbine nozzle of this exemplary design has been successfully used in commercial service in the United States for many years in first stage turbine nozzles of aircraft gas turbine engines. However, experience has shown that the braze joint in the trailing edge region of the vanes is subject to oxidation over extended use which limits the useful life of the turbine nozzle. Braze joint oxidation is due to the relatively high temperature experienced by the braze joint in this local region.

The cooling ability of the trailing edge apertures is at the useful limit since the size thereof is limited by maximum permitted stress during operation, and the placement of the last apertures near the outer and inner bands is limited by the manufacturing process for preventing undesirable plugging thereof by the braze material.

Accordingly, it is desired to provide a turbine nozzle having improved cooling of the braze joint in the trailing edge region of the vane for reducing oxidation thereof and improving the useful life of the turbine nozzle.

BRIEF SUMMARY OF THE INVENTION

A nozzle vane includes a row of trailing edge apertures and cooperating inboard slots joined in flow communication with a mid-chord cavity. An outboard slot is spaced outwardly from a respective last one of the inboard slots, and outboard of a respective last one of the trailing edge apertures. The outboard slot extends behind a braze joint between the vane and a supporting band and is effective for backside cooling thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
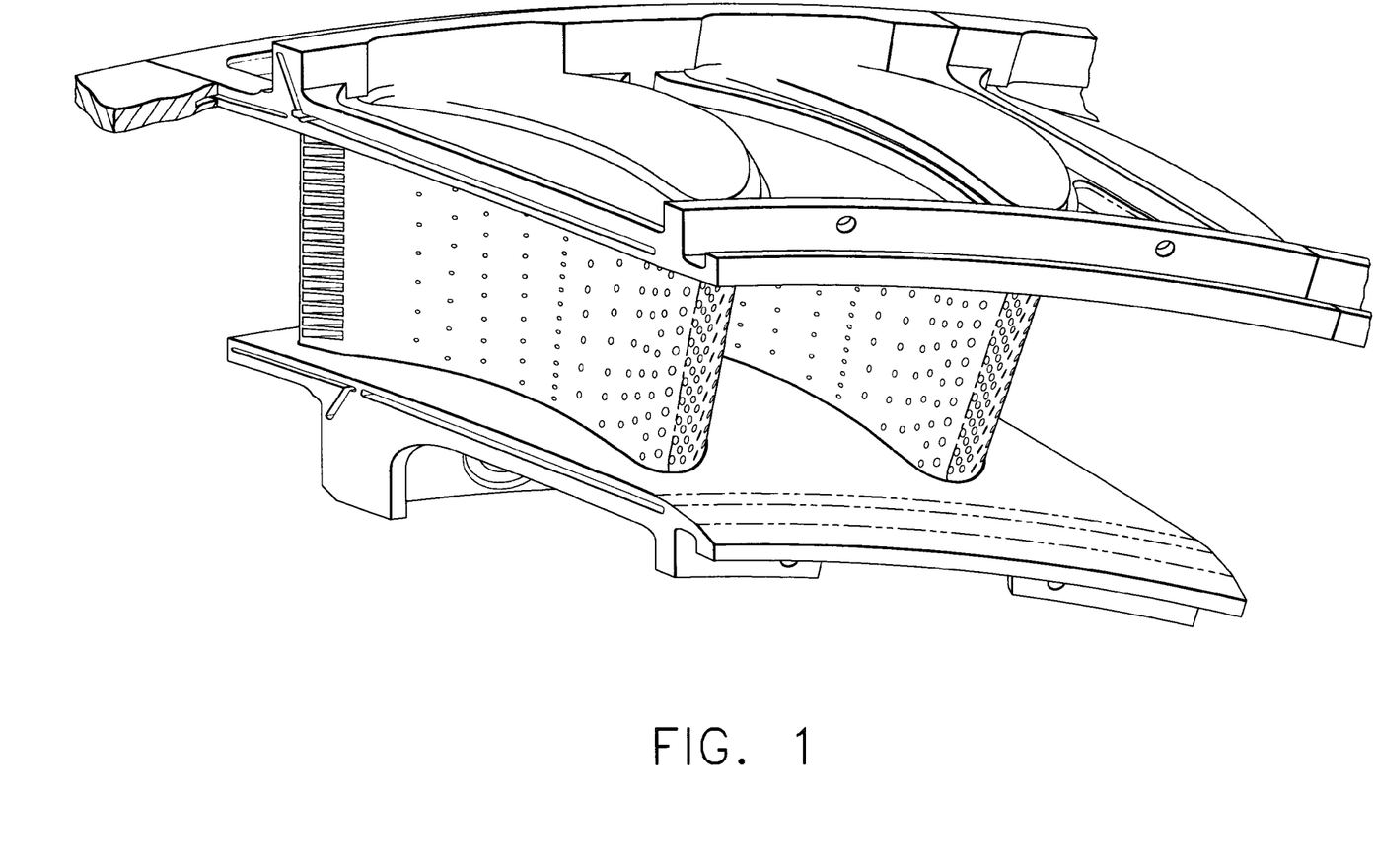
FIG. 1 is an isometric view of a portion of an annular turbine nozzle in accordance with an exemplary embodiment of the present invention.

Illustrated in FIG. 1 is a portion of an asymmetrical first stage turbine nozzle 10 of a high pressure turbine disposed directly downstream from a combustor (not shown) of a turbofan aircraft gas turbine engine. During operation, hot combustion gases 12 are discharged from the combustor and channeled through the nozzle 10 which directs the gases between turbine rotor blades (not shown) extending outwardly from the perimeter of the rotor disk being powered thereby.

Figure 2:
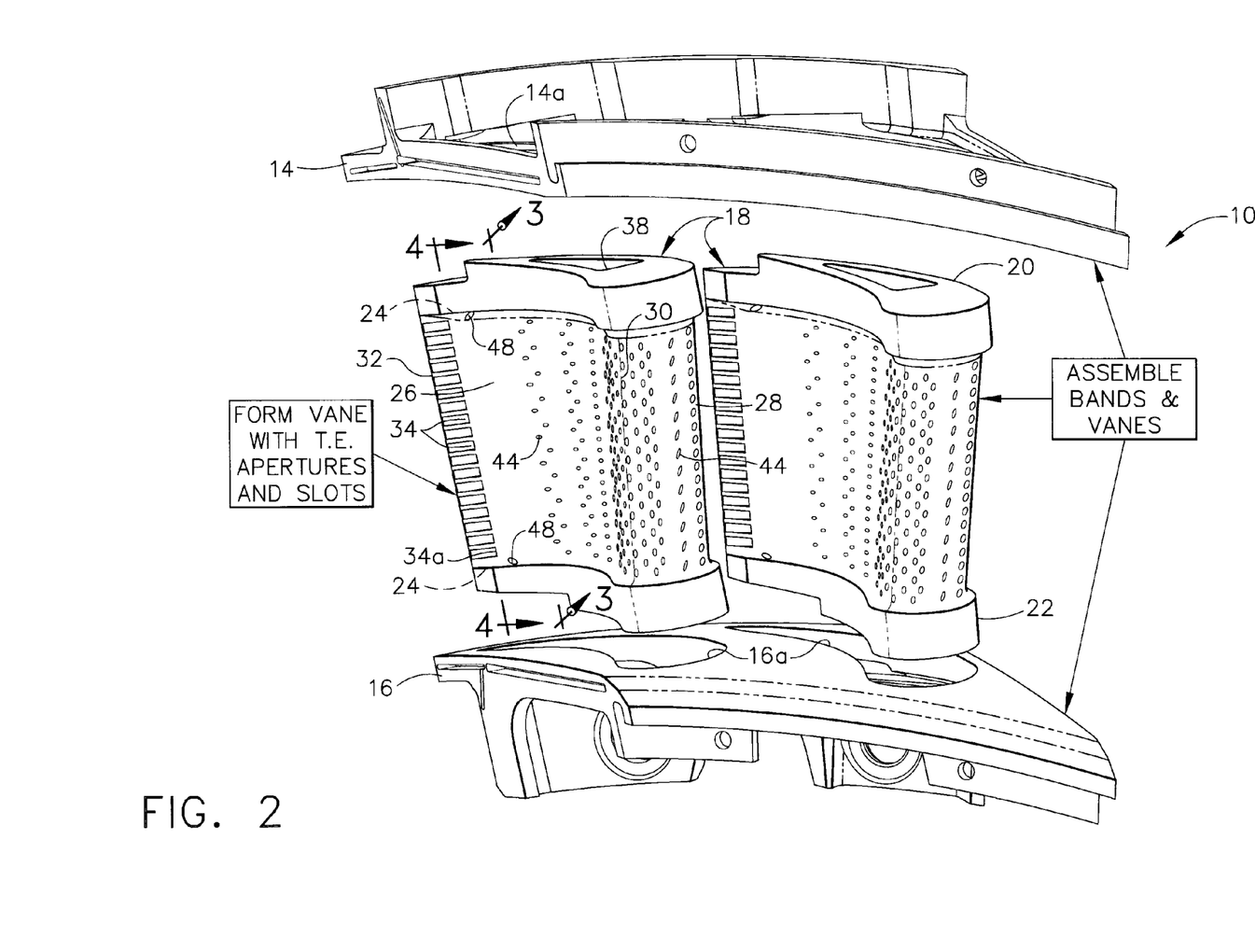
FIG. 2 is an exploded view of an arcuate segment of the nozzle illustrated in FIG. 1 including a pair of nozzle vanes brazed to corresponding outer and inner bands.

The nozzle includes arcuate outer and inner bands 14,16 each having respective pairs of vane seats 14a,16a extending radially therethrough as illustrated in FIG. 2.

A pair of hollow vanes 18 are spaced circumferentially from each other and extend radially between the bands. Each vane has a radially outer root 20 and radially inner root 22 at opposite ends of the vane which are disposed in corresponding ones of the vane seats 14a,16a.

The vane has a typical airfoil configuration, and the vane seats are in the form of complementary airfoil apertures through the bands which receive the corresponding vane roots in a close fit therein.

The two bands 14,16 and the two vanes 18 are fixedly joined together in an integral assembly by corresponding full perimeter braze joints 24 at the interface between the root ends of the vanes and the inner or inboard surfaces of the corresponding bands.

As shown in FIG. 2, each of the vanes 18 has an airfoil profile with a first or pressure sidewall 26, which is generally concave, and a second or suction sidewall 28, which is generally convex, joined together at chordally opposite leading and trailing edges 30,32 which extend radially along the span of the vane between the two bands.

Figure 3:
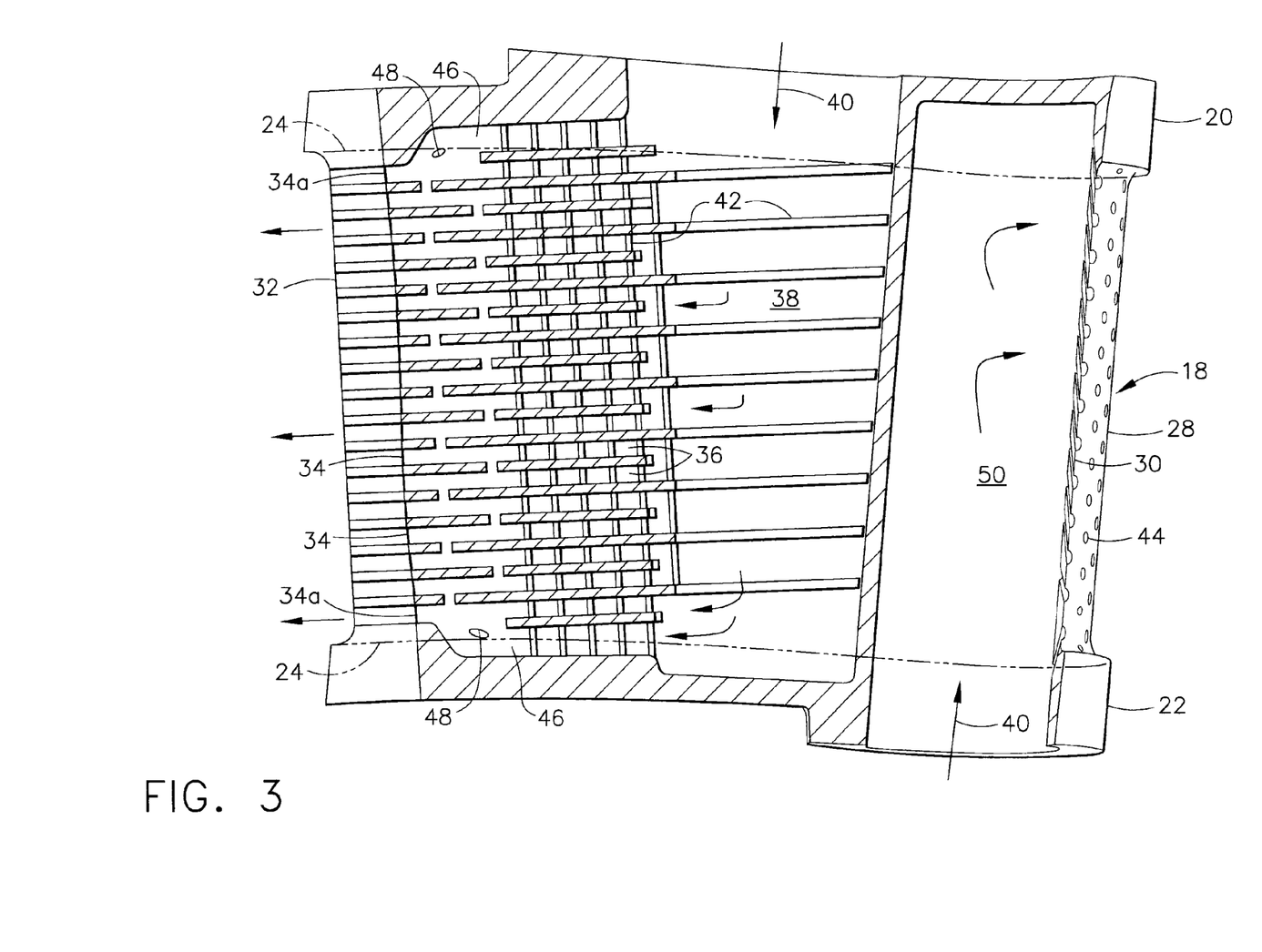
FIG. 3 is an axial sectional view through one of the vanes illustrated in FIG. 2 and taken generally along line 3—3.

As shown in FIGS. 2 and 3, each vane includes a row of trailing edge apertures 34, and cooperating inboard axial channels or slots 36 extending inside the trailing edge region of the vane in flow communication with a mid-chord cavity 38.

The outer and inner vane roots 20,22 are imperforate or solid between the trailing edge 32 and the mid-chord cavity 38 except for an outer inlet for the mid-chord cavity 38 which extends through the outer root and outer band for receiving pressurized cooling air 40 bled from the compressor (not shown) of the engine.

As shown in FIG. 3, the internal inboard slots 36 are defined by corresponding radially spaced apart axial ribs which bridge the opposite sidewalls of the vane. The inboard slots extend in a radial row and have corresponding inlets at the mid-chord cavity 38 for receiving the cooling air therefrom which is then channeled axially aft through the trailing edge region of the vane for discharge through the corresponding trailing edge apertures 34.

The cavity 38 may include radially spaced apart turbulators 42 extending axially, with the individual inboard slots 36 also including chordally spaced apart ones of the turbulators 42 extending radially for enhancing internal cooling of the vane. Turbulators are conventional, and are configured as elongate ribs which extend partly inwardly from the inner surfaces of the vane for tripping the cooling air as it flows thereover. In this way, the mid-chord cavity 38 and the array of inboard slots 36 provide effective internal cooling of the vane from its mid-chord region down to the trailing edge from which the cooling air is discharged through the trailing edge apertures 34.

As shown in FIG. 2, both sidewalls of the vane may include conventional film cooling holes 44 extending therethrough in flow communication with the mid-chord cavity or inboard slots, for example, for discharging the cooling air therefrom to create protective films of cooling air over the outer surface of the vane.

As initially shown in FIG. 1, when the vanes are brazed into the bands, the trailing edge apertures 34 must be spaced inboard from the inner surfaces of the two bands and away from the resulting braze joints 24 themselves in order to prevent undesirable plugging of the adjacent apertures with braze material. FIG. 3 illustrates in more detail that each vane includes a pair of trailing edge terminal or last apertures 34a which are the outboard-most ones thereof directly adjacent to the outer and inner bands, respectively, and the corresponding braze joints 24 thereat.

During initial manufacture, the last apertures 34a are predeterminedly spaced inboard from the respective root ends 20,22 of the vane so that when the roots are seated in their corresponding vane seats in the bands, the last apertures are spaced away from the inner surfaces of the bands for permitting brazing of the joint thereat without plugging those apertures with the braze material. In this way, the inboard placement of the last apertures avoids the resulting braze joint and is not subject to braze plugging.

In accordance with a preferred embodiment of the present invention as illustrated in FIG. 3, each vane further includes a pair of outboard channels or slots 46 cooperating with respective ones of the last trailing edge apertures 34a at respective opposite root ends of each vane for backside cooling the braze joints 24 at both the outer and inner bands. The outboard slots 46 are similar to the inboard slots 36 and extend axially in flow communication between the respective last apertures 34a and the common mid-chord cavity 38.

The outboard slots 46 extend at least in part through the otherwise solid vane roots 20,22 below the exposed inner surfaces of the bands and behind the corresponding braze joints 24 illustrated in phantom line in FIG. 3. In this way, the cooling air 40 from the mid-chord cavity 38 may be channeled directly behind the braze joints in the thin trailing edge region of the vane for discharge from the last apertures 34a. The braze joint in this local area is therefore additionally cooled for reducing or preventing oxidation thereof and further improving the useful life of the turbine nozzle.

Figure 4:
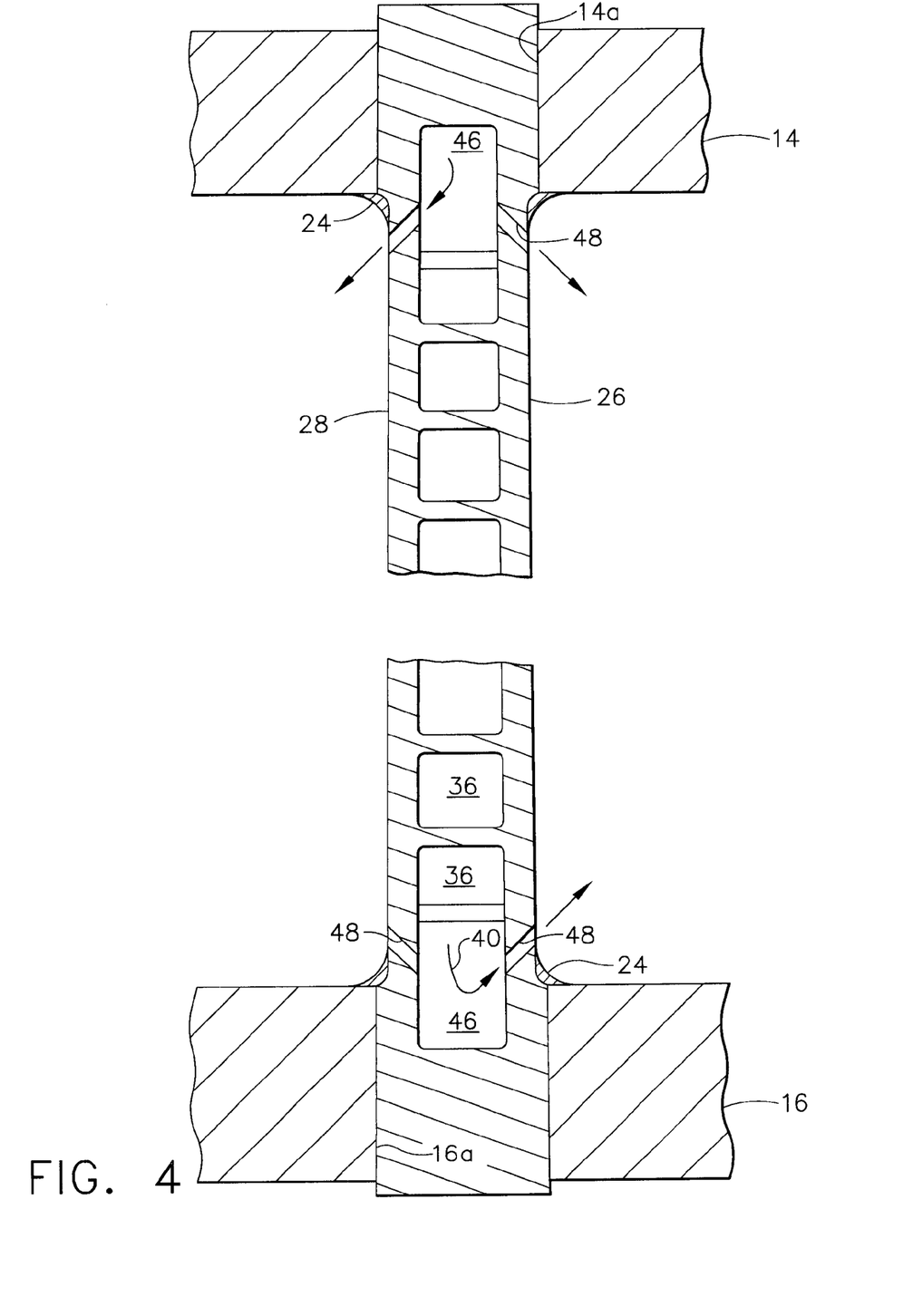
FIG. 4 is a radial sectional view through one of the vanes illustrated in FIG. 2 and taken along line 4—4.

As shown in FIG. 4, the vane sidewalls 26,28 are spaced apart to define the internal flow passages therethrough, and the outboard slots 46 at opposite root ends thereof extend between both sidewalls for backside cooling the corresponding braze joints 24 along both sidewalls near the vane trailing edge.

As shown in FIG. 3, both outboard slots 46 preferably extend substantially straight from the mid-chord cavity 38 toward the trailing edge 32 and locally bend or jog at the aft ends thereof to cross behind the corresponding braze joints 24 to terminate at the respective last trailing edge apertures 34a. In this way, the braze joint is backside cooled from the mid-chord cavity aft to the trailing edge apertures 34a with the cooling air then being discharged therefrom.

In the exemplary embodiment illustrated in FIG. 3, the trailing edge apertures 34 are located slightly forward of the trailing edge itself and breach the pressure side of the vane, with the suction side of the vane remaining imperforate. This trailing edge region of the vane is aerodynamically thin, and the outboard slots 46 provide effective backside cooling of the braze joints as the cooling air is channeled therethrough and discharged from the last apertures.

As shown in FIG. 3, the array or bank of inboard slots 36 channels cooling air axially aft from the mid-chord cavity 38 for discharge from respective ones of the trailing edge apertures 34 for cooling the thin trailing edge region of each vane radially between the two bands. The pair of outboard slots 46 are similarly disposed in axial flow communication between the mid-chord cavity 38 and respective ones of the last trailing edge apertures 34a for providing additional cooling into the corresponding vane roots behind respective portions of the braze joints 24.

As indicated above, the last trailing edge apertures 34a illustrated in FIG. 3 must be suitably spaced away from the resulting braze joints 24 at the corresponding outer and inner bands to prevent braze plugging of those apertures. Accordingly, each of the outboard slots 46 preferably terminates in common with an adjacent or outboard last one of the inboard slots 36 at a respective ones of the last apertures 34a. In this way, the cooling air channeled through each outboard slot 46 joins air channeled through the adjoining inboard slot 36 for discharge through the common last aperture 34a.

However, each trailing edge aperture 34,34a is specifically sized for discharging cooling air at a desired flowrate. The size of the last aperture 34a may accordingly be limited by stress limits imposed on the vane and may be insufficient for discharging air from both its dedicated inboard slot and the additional outboard slot 46.

Accordingly, each of the vanes 18 may further include one or more side apertures or outlets 48 extending through one or both sidewalls 26,28, as shown in FIGS. 3 and 4, in flow communication with a respective one of the outboard slots 46 for additionally discharging the cooling air therefrom.

As shown in FIG. 3, the side outlets 48 are preferably disposed at the end bend in each of the outboard slots 46 and exit the sidewalls away from the corresponding braze joints 24 as illustrated in FIG. 4 to prevent braze plugging thereof during manufacture. As shown in FIG. 4, the side outlets 48 may be disposed through both vane sidewalls 26,28 if required, although the side outlets may be used solely in either sidewall if desired.

The number and specific location of the side outlets 48 may be determined for each design application for ensuring suitable flowrate through the outboard slots 46 for enhancing braze joint cooling thereat. A particular advantage of locating the side outlets 48 at the terminus bend of the outboard slots is that the cooling air from either the outboard slot or its adjoining inboard slot may be discharged from either the side outlet 48 or the common last aperture 34a.

As illustrated initially in FIG. 2, the turbine nozzle 10 may be made by initially forming the individual vanes 18 and outer and inner band segments 14,16 in a conventional manner such as by casting. All of the internal features of the individual vanes 18 may be formed by suitably casting the vanes 18. For example, FIG. 3 illustrates an exemplary form of the internal cooling features which may be cast into the vane including the mid-chord cavity 38 with its outer band inlet, and the cooperating axial slots 36,46 which discharge the cooling air through the trailing edge apertures 34.

In a typical first stage, high pressure turbine nozzle configuration illustrated in FIG. 3, each vane 18 preferably also includes a radially extending forward cavity 50 having a bottom inlet through the vane root 22 which receives the cooling air 40 through the inner band. The vane outer root 20 is solid or imperforate at the forward cavity 50. And, the forward cavity 50 and the mid-chord cavity 38, which is aft relative to the forward cavity, are separated from each other by an integral imperforate bridge extending between the two sides of the vane for providing independent cooling circuits. The forward cavity 50 is configured in any conventional manner for cooling the leading edge portion of each vane, with the cooling air being discharged through various rows of additional film cooling holes 44 in a conventional manner.

Accordingly, the vanes 18 illustrated in FIG. 2 may be initially cast for forming all the desired internal cooling features thereof including the inboard and outboard slots 36,46 illustrated in FIG. 3. Typically, the trailing edge apertures 34,34a may also be formed in the casting process, or may be otherwise formed or drilled after casting. The film cooling holes 44, and the side outlets 48, if used, may then be suitably drilled through the cast vanes in any conventional manner.

The vanes and bands are then suitably assembled together, with the vane roots being disposed inside the vane seats of the corresponding bands. The vanes are then conventionally brazed at their roots to the corresponding bands without plugging the last trailing edge apertures 34a in a conventional manner. Since the side outlets 48, if used, are located above the resulting braze joint, they too are protected from braze plugging by their elevated location away from the braze joint.

Since the outboard slots 46 are internal features of each vane, they are protected therein from the braze process and maintain their cooling effectiveness without regard to brazing performed outside the vane.

The resulting turbine nozzle 10 illustrated in FIG. 1 then enjoys all of the advantages of the original turbine nozzle, but now includes the additional outboard slots 46 therein for improving backside cooling of the braze joints 24 between the mid-chord cavity 38 and the trailing edge apertures. The resulting turbine nozzle therefore will enjoy improved useful life and durability due to reduction or elimination of braze oxidation in this region.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A turbine nozzle comprising:
   outer and inner bands having respective pairs of vane seats extending therethrough;
   a pair of vanes having respective roots disposed in said vane seats, and fixedly joined therein by corresponding braze joints, and including opposite sidewalls joined together at opposite leading and trailing edges; and
   each of said vanes further includes a last trailing edge aperture spaced inboard from a corresponding braze joint and disposed in flow communication with an outboard slot bridging said sidewalls and extending behind said braze joint for channeling cooling air from a mid-chord cavity of said vane to said last aperture for backside cooling said braze joint therealong.

2. A nozzle according to claim 1 wherein said outboard slot extends substantially straight from said mid-chord cavity toward said trailing edge, and bends at an aft end thereof to cross behind said braze joint to terminate at said last apertured.

3. A nozzle according to claim 2 wherein said vane roots are imperforate between said trailing edge and mid-chord cavity except for an inlet therethrough for said mid-chord cavity.

4. A nozzle according to claim 3 wherein each of said vanes includes a pair of said last trailing edge apertures and cooperating pair of outboard slots at respective opposite root ends thereof for backside cooling said braze joints at both said outer and inner bands.

5. A nozzle according to claim 4 wherein each of said vanes further comprises:
   a row of trailing edge apertures, including said pair of last apertures adjacent said outer and inner bands; and
   an array of inboard slots disposed between said pair of outboard slots in flow communication between said mid-chord cavity and respective ones of said trailing edge apertures.

6. A nozzle according to claim 5 wherein each of said outboard slots terminates in common with an adjacent one of said inboard slots at a respective one of said last apertures.

7. A nozzle according to claim 6 wherein each of said vanes further comprises a side outlet extending through one of said sidewalls in flow communication with a respective one of said outboard slots for discharging said cooling air therefrom.

8. A nozzle according to claim 7 wherein said side outlet is disposed at said bend in said outboard slot, and exits said sidewall away from said braze joint.

9. A nozzle according to claim 8 wherein respective ones of said side outlets are disposed through both sidewalls of said vanes.

10. A method of making said nozzle according to claim 1 comprising:

forming said vanes with said last trailing edge apertures and cooperating outboard slots;

assembling said vanes and bands together; and brazing said vanes at said roots to said bands without plugging said last apertures.

11. A method-of making said nozzle according to claim 7 comprising:

forming said vanes with said last trailing edge apertures and cooperating outboard slots;

assembling said vanes and bands together; and brazing said vanes at said roots to said bands without plugging said last apertures and said side outlet.

12. A nozzle vane including a row of trailing edge apertures and cooperating inboard slots joined in flow communication with a mid-chord cavity, and a pair of outboard slots spaced outwardly from respective last ones of said inboard slots at opposite ends of said vane and outboard of respective last ones of said trailing edge apertures.

13. A vane according to claim 12 wherein each of said outboard slots terminates in common with an adjacent one of said inboard slots at a respective one of said last apertures.

14. A vane according to claim 13 further comprising opposite sidewalls joined together at opposite leading and trailing edges; and said outboard slot extends between said sidewalls for backside cooling both said sidewalls near said trailing edge.

15. A vane according to claim 14 wherein said outboard slots extend substantially straight from said mid-chord cavity toward said trailing edge, and bend at an aft end thereof to cross over to said last inboard slots at-said trailing edge.

16. A vane according to claim 15 wherein said last apertures are spaced inboard from respective root ends of said vane for avoiding a braze joint thereat when brazed to outer and inner nozzle bands.

17. A vane according to claim 16 further comprising a side outlet extending through one of said sidewalls in flow communication with a respective one of said outboard slots for discharging cooling air therefrom.

18. A vane according to claim 17 wherein said side outlet is disposed at said bend in said outboard slot, and exits said sidewall for avoiding said braze joint.

19. A nozzle vane including a row of trailing edge apertures joined in flow communication with a mid-chord cavity by corresponding inboard channels bridging opposite sidewalls of said vane for discharging cooling air at corresponding flowrates through said apertures, and a pair of outboard channels bridging said vane sidewalls and spaced outwardly from respective last ones of said inboard channels at opposite ends of said vane and outboard of respective last ones of said trailing edge apertures, and said outboard channels terminating in common with respective ones of said last inboard channels.

20. A vane according to claim 19 further comprising a side outlet extending through one of maid sidewalls in flow communication with a terminus bend of a respective one of said outboard channels for discharging cooling air therefrom.

* * * * *

UNITED STATES PATENT AND TRADEMARK OFFICE
CERTIFICATE OF CORRECTION

| | | |
|---|---|---|
| PATENT NO. | : 6,439,837 B1 | Page 1 of 2 |
| APPLICATION NO. | : 09/604127 | |
| DATED | : August 27, 2002 | |
| INVENTOR(S) | : Heyward et al. | |

It is certified that error appears in the above-identified patent and that said Letters Patent is hereby corrected as shown below:

Claim 2, line 5, delete "apertured" and substitute --aperture--.
Claim 11, line 1, delete "method-of" and substitute --method of--.
Claim 15, line 4, delete "at-said" and substitute --at said--.
Claim 20, line 2, delete "maid" and substitute --said--.

UNITED STATES PATENT AND TRADEMARK OFFICE
CERTIFICATE OF CORRECTION

PATENT NO.       : 6,439,837 B1
APPLICATION NO.  : 09/604127
DATED            : August 27, 2002
INVENTOR(S)      : Heyward et al.

It is certified that error appears in the above-identified patent and that said Letters Patent is hereby corrected as shown below:

Delete Fig. 1 and substitute therefor the following corrected Fig. 1:

FIG. 1

Signed and Sealed this

Twenty-seventh Day of March, 2007

JON W. DUDAS
*Director of the United States Patent and Trademark Office*